United States Patent
Maeda et al.

(10) Patent No.: US 8,459,655 B2
(45) Date of Patent: Jun. 11, 2013

(54) SEALING DEVICE

(75) Inventors: Toshiyuki Maeda, Kitaibaraki (JP);
Yoshiyuki Abe, Kitaibaraki (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 13/497,999

(22) PCT Filed: Sep. 22, 2010

(86) PCT No.: PCT/JP2010/066400
§ 371 (c)(1),
(2), (4) Date: Mar. 23, 2012

(87) PCT Pub. No.: WO2011/040305
PCT Pub. Date: Apr. 7, 2011

(65) Prior Publication Data
US 2012/0235360 A1    Sep. 20, 2012

(30) Foreign Application Priority Data
Oct. 2, 2009 (JP) .................................. 2009-230932

(51) Int. Cl.
*F16J 9/06* (2006.01)
(52) U.S. Cl.
USPC ............................ 277/589; 277/496; 277/545

(58) Field of Classification Search
USPC ................. 277/434, 435, 437, 487, 496, 500, 277/543, 545, 589
See application file for complete search history.

(56) References Cited

U.S. PATENT DOCUMENTS

| 3,885,800 A * | 5/1975 | Sievenpiper | 277/468 |
| 5,467,689 A * | 11/1995 | Carlin et al. | 92/172 |
| 6,502,826 B1 * | 1/2003 | Schroeder et al. | 277/468 |

FOREIGN PATENT DOCUMENTS

| JP | 2523646 | 10/1996 |
| JP | 2587026 | 10/1998 |

* cited by examiner

*Primary Examiner* — Gilbert Lee
(74) *Attorney, Agent, or Firm* — K. David Crockett, Esq.; Niky Economy Syrengelas, Esq.; Crockett & Crockett, PC

(57) ABSTRACT

A sealing device (1) having: a slide ring (2) and a back ring (3). The sealing device (1) is configured to seal an annular gap between a housing having a shaft hole, and a shaft inserted through the shaft hole. The slide ring (2) has: a through-cut (22), comprising a circumferential cut (22A), and axial cuts (22B) extending from both ends of the circumferential cut, along the axial direction; and multiple parting lines (23A, 23B) formed on a surface of the slide ring (2). The parting lines (23A, 23B) are arranged so that the parting lines (23A, 23B) are not overlapped with the circumferential cut (22A) exposed at the junction surface of the slide ring (2) with the back ring (3), throughout the lengthwise direction of the circumferential cut.

3 Claims, 4 Drawing Sheets

US 8,459,655 B2

SEALING DEVICE

TECHNICAL FIELD

The present invention relates to a sealing device, and particularly to a sealing device comprising a combination of a slide ring made of a resin and a back ring made of an elastic body, so as to prevent leakage of a fluid between those members of a hydraulic/pneumatic equipment which are configured to be slid relative to each other.

BACKGROUND ART

Sealing devices have been conventionally used, each configured to seal an annular gap between a housing having a shaft hole and a shaft inserted through the shaft hole in a manner to conduct a movement relative to the housing, such as in case of a piston seal, rod seal, or the like, where each sealing device comprises a combined seal including: a slide ring acting as a sliding member to be abutted on a sliding surface of a mating member; and a back ring combined with the slide ring and joined to that surface (outer peripheral surface or inner peripheral surface) of the slide ring which surface is reverse to the sliding surface of the slide ring, in a manner to provide the slide ring with a predetermined resilient force (Patent Documents 1 and 2).

Such a sealing device is fitted in an annular concave groove provided to face the annular gap, such that the slide ring side is contacted with a sliding surface of the mating member.

It is difficult to fit such a slide ring into the annular concave groove, particularly when a high strength material is used for the slide ring. As such, it has been practiced to provide the slide ring with a through-cut in a direction traversing the circumferential direction of the slide ring, in a manner to cause the slide ring to be expanded at the through-cut, thereby improving an attaching ability of the slide ring.

FIG. 6 is a cross-sectional view of such a sealing device. This sealing device 100 comprises a slide ring 200, and a back ring 300 joined to an inner peripheral surface side of the slide ring, thereby constituting a combined seal.

The sealing device has a through-cut 201 in a step cut shape comprising: a single circumferential cut 201A extending over a predetermined length along a circumferential direction of the slide ring 200; and two axial cuts 201B, 201B extending from both ends of this circumferential cut 201A in mutually opposite directions, respectively, along the axial direction (X direction in this figure) of the slide ring 200; in consideration of sealability.

Such a slide ring 200 is fabricated at a lower cost, by typically adopting a mold formed with a cavity corresponding to a slide ring shape, in a manner to inject a resin material into the mold.

FIG. 7 is a cross-sectional view of a conventional mold to be used upon injection molding the slide ring 200.

The mold 400 has a cavity 401 therein corresponding to the slide ring shape. The mold 400 is typically formed with junction of molds 402A, 402B along a circumferential direction of the mold at positions corresponding to both of outer peripheral side and inner peripheral side of a substantially middle region of the slide ring 200 in its axial direction after molding, respectively, so as to facilitate drawing of the molded slide ring 200 from the mold, and the mold 400 is made to be dividable into two partial molds 400A, 400B at the junction of molds 402A, 402B, thereby allowing the mold to be opened in the axial direction of the slide ring 200.

PRIOR ART DOCUMENTS

Patent Documents

Patent Document 1: Japanese Utility Model Registration No. 2,523,646
Patent Document 2: Japanese Utility Model Registration No. 2,587,026

DISCLOSURE OF THE INVENTION

Problem to be Solved by the Invention

When the slide ring 200 is injection molded by adopting such a mold 400, stepped portions, burrs, and the like along the junction of molds 402A, 402B are caused in a molding. The stepped portions are to be formed by discrepancies at junction of molds 402A, 402B, respectively, due to precision variances of the partial molds 400A, 400B. In turn, the burrs are to be formed by invasion of a resin material into gaps at the junction of molds 402A, 402B, when the resin material is pressurizedly introduced into the cavity 401. These stepped portions, burrs, and the like constitute parting lines 202A, 202B on an outer peripheral surface and an inner peripheral surface of the slide ring 200 after molding and along the circumferential direction of the slide ring, correspondingly to the junction of molds 402A, 402B, respectively, as shown in FIG. 6.

In the case that the parting lines 202A, 202B comprising the stepped portions, burrs or the like are large (i.e., the parting lines are large in radial height), the parting line 202B (stepped portion, burr, or the like) of the slide ring 200 positioned at its junction surface with the back ring 300 inevitably wears the surface of the back ring 300 when the slide ring 200 is joined to the back ring 300 to thereby establish a sealing device which is then provided for a long-term usage, resulting in formation of a damaged portion (worn portion) 302 on a junction surface 301 of the back ring 300 with the slide ring 200, as shown in FIG. 8.

Further, the junction surface 301 of the back ring 300 with the slide ring 200 is sometimes subjected to formation of damaged portions (worn portions) 303, 303 due to wear and damage to be caused by the axial cuts 201B, 201B of the through-cut 201 formed on the slide ring 200, and along the axial cuts 201B, 201B, respectively. This is because, the axial cuts 201B, 201B tend to cause gaps, stepped portions, or the like of the slide ring in its usage state fitted in an annular concave groove, in a manner to attack the surface of the back ring 300, more likely than the circumferential cut 201A does.

At this time, if the parting line 202B formed on the slide ring 200 is positioned to be overlapped with and throughout the lengthwise direction of the circumferential cut 201A of the through-cut 201 similarly formed on the surface of the slide ring 200, it is likely that the damaged portion 302 along the parting line 202B extends across both of the two damaged portions 303, 303 along the axial cuts 201B, 201B, respectively, or it is likely that the damaged portion 302 is formed to be contacted with both of the two damaged portions 303, 303, resulting in that the damaged portions 303, 303 along the axial cuts 201B, 201B are communicated with each other through the damaged portion 302 along the parting line 202B, thereby bringing about formation of a leakage channel 304 traversing the sealed portion as indicated by arrows in the figure to thereby problematically deteriorate the sealability.

It is therefore an object of the present invention to provide a sealing device capable of maintaining a seal over a long period of time, without a problem of a leakage channel to be otherwise formed such that a damaged portion of a back ring caused by a parting line formed on a slide ring surface by injection molding, communicates with damaged portions of the back ring caused by a through-cut in a step cut shape of the slide ring.

Other objects of the present invention will become apparent from the following description.

Means for Solving the Problem

The above object is carried out by the following inventions.

The invention recited in claim 1 resides in a sealing device having: a slide ring made of a resin; and a back ring made of an elastic body joined to an inner peripheral surface or outer peripheral surface of the slide ring as a junction surface; the sealing device being configured to seal an annular gap between a housing having a shaft hole, and a shaft inserted through the shaft hole in a manner to conduct a movement relative to the housing;

wherein the slide ring has: a through-cut in a step cut shape, comprising a single circumferential cut extending along a circumferential direction of the slide ring, and two axial cuts extending from both ends of the circumferential cut in mutually opposite directions, respectively, along the axial direction of the slide ring; and multiple parting lines formed on a surface of the slide ring along the circumferential direction of the slide ring, where the parting lines have been formed by injection molding the slide ring by a mold dividable into multiple partial molds at multiple junction of molds along the circumferential direction of the mold, and by subsequently parting the mold at the junction of molds; and wherein the parting lines are arranged so that the parting lines are not overlapped with the circumferential cut exposed at the junction surface of the slide ring with the back ring, throughout the lengthwise direction of the circumferential cut.

The invention of claim 2 resides in the sealing device according to claim 1, wherein that of the multiple parting lines which is formed at the junction surface of the slide ring with the back ring, is arranged at a position shifted from the circumferential cut toward an axial end side of the slide ring.

The invention of claim 3 resides in the sealing device according to claim 1, wherein all the parting lines are arranged on those surfaces of the slide ring other than the junction surface of the slide ring with the back ring.

Effect of the Invention

According to the present invention, a damaged portion of a back ring to be caused by an applicable parting line formed on a surface of a slide ring by injection molding, is prevented from being communicated with a damaged portion of the back ring to be caused by a through-cut in a step cut shape of the slide ring, thereby enabling to obtain a sealing device capable of keeping a sealability thereof over a long period of time.

EXPLANATION OF LETTERS OR NUMERALS

Figure 1:
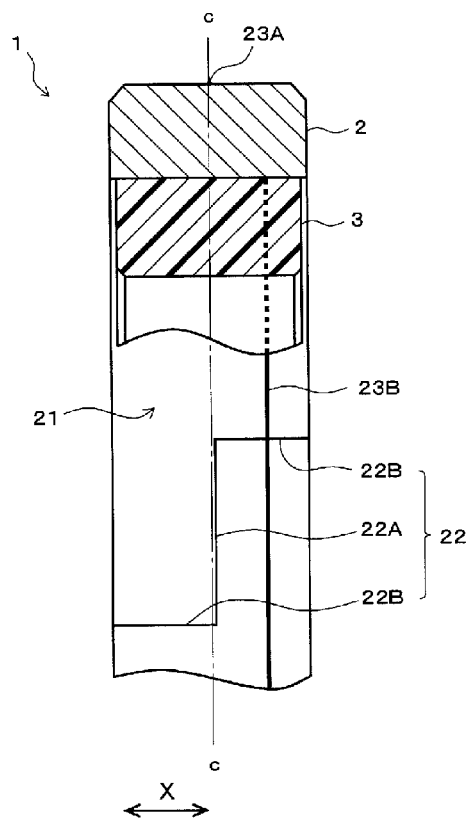
FIG. 1 is a cross-sectional view of a sealing device according to the present invention.

1: sealing device
2: slide ring
21: junction surface with back ring
22: through-cut
22A: circumferential cut
22B: axial cut
23A, 23B: parting line
3: back ring
31: junction surface with slide ring
32, 33: damaged portion
4: mold
4A, 4B: partial mold
41: cavity
42A, 42B: junction of molds
43, 44: cavity face
45: intersection line

BEST MODE(S) FOR CARRYING OUT THE INVENTION

The sealing device according to the present invention constitutes a seal ring comprising a combined seal having: a slide ring made of a resin; and a back ring made of an elastic body joined to an inner peripheral surface or outer peripheral surface of the slide ring. So as to seal an annular gap to be formed between a housing having a shaft hole and a shaft inserted through the shaft hole in a manner to conduct a movement relative to the housing, such a sealing device is fitted in an annular concave groove to be concavely provided on an inner peripheral surface of the shaft hole or on an outer peripheral surface of the shaft such that the back ring side is placed at a groove bottom side, and such that the slide ring is slid relative to a sliding surface of the mating member.

The slide ring in the present invention is molded by adopting a mold, and is typically molded by injecting a resin material into the mold. Typically used as the resin material for the slide ring is PTFE (tetrafluoroethylene resin), PA (polyamide resin), or the like, and examples of the resin material for a high pressure application particularly include a nylon (PA) as a high strength material, and the like.

In turn, the back ring comprises an elastic body molded into a continuous, unbroken ring (an endless shape) over its entire circumference. Examples of the back ring material typically include rubber materials (elastic bodies) such as NBR (nitrile rubber), PU (polyurethane), and the like.

The mold to be adopted upon injection molding the slide ring is divided into multiple partial molds at multiple junction of molds along the circumferential direction of the mold, and the mold is opened in an axial direction of the slide ring as a molding so that the molding in the mold is drawn therefrom. The slide ring in the present invention is injection molded by adopting such a mold, such that multiple parting lines comprising stepped portions, burrs, or the like are formed on a surface of the slide ring at those positions corresponding to the junction of molds, respectively, along the circumferential direction of the slide ring, due to mold parting.

Further, to improve an attaching ability, the slide ring in the present invention has a through-cut in a step cut shape comprising: a single circumferential cut extending along a circumferential direction of the slide ring; and two axial cuts extending from both ends of this circumferential cut in mutually opposite directions, respectively, along the axial direction of the slide ring. This allows the slide ring to be expanded at the region of the through-cut. The through-cut may be formed by means of the mold simultaneously with the injection molding, or may be belatedly worked out by appropriate cutting means after once obtaining a slide ring in a continuous, unbroken ring (an endless shape) by injection molding.

Since the through-cut penetrates through the slide ring in a manner to communicate the outer peripheral surface and inner peripheral surface of the slide ring with each other, the through-cut is exposed at these outer peripheral surface and inner peripheral surface. Thus, no matter to which of the outer peripheral surface and inner peripheral surface of the slide ring the back ring is joined, the back ring is affected by wear and damage by the axial cuts of the through-cut, thereby bringing about a possibility that damaged portions (worn portions) are caused on the junction surface of the back ring with the slide ring due to the axial cuts.

The present invention is characterized in that (i) the circumferential cut to be exposed at the junction surface of the slide ring with the back ring, and (ii) the applicable parting line on the slide ring which parting line comprises stepped portions, burrs, or the like to be formed along the circumferential direction of the slide ring due to the applicable junction of molds of the mold, are arranged so that the circumferential cut and the parting line are not overlapped with each other throughout the lengthwise direction of the circumferential cut. Namely, the applicable parting line is not formed at a position mutually aligned with the circumferential cut formed on the surface of the slide ring itself at least throughout the lengthwise direction of the circumferential cut, so that the applicable parting line formed on the surface of the slide ring never extends across both of the two axial cuts, nor is contacted with both of the two axial cuts.

Thus, the damaged portion to be formed on the surface of the back ring due to the applicable parting line on the surface of the slide ring, is never formed at such a position that the damaged portion extends across both of the two damaged portions to be formed on the surface of the back ring due to the axial cuts of the slide ring, or the damaged portion is contacted with both of the two damaged portions, thereby avoiding such a situation that the damaged portion along the parting line and the damaged portions along the axial cuts, respectively, are communicated with each other to bring about formation of a leakage channel traversing the sealed portion. This maintains the sealability over a long period of time.

Arrangement of parting lines to be formed on a surface of a slide ring is determined by positions of junction of molds. Although it is typical to form two junction of molds along its circumferential direction so that the mold is divided into two halves which can be opened in an axial direction of the mold, it is also possible to form three or more junction of molds along its circumferential direction to thereby form three or more parting lines on a surface of a slide ring along its circumferential direction. Also in this case, the parting lines are to be arranged such that none of the parting lines is formed at a position mutually overlapped with the circumferential cut to be exposed at the junction surface throughout the lengthwise direction of the circumferential cut, so that none of the parting lines extends across both of the two axial cuts, nor is contacted with both of the two axial cuts.

It is therefore enough for the slide ring in the present invention that the applicable parting line may be arranged at any position on the surface of the slide ring, insofar as the parting line is arranged in such a manner not overlapped with the circumferential cut to be exposed at the junction surface of the slide ring with the back ring throughout the lengthwise direction of the circumferential cut so that the opening operation of the mold is never obstructed.

For example, it is possible that the parting line to be formed on the junction surface of the slide ring with the back ring is arranged at a position shifted from the circumferential cut toward an axial end side of the slide ring, thereby avoiding an overlap between the circumferential cut and the parting line.

Further, it is also possible that all the parting lines to be formed on the surfaces of the slide ring are arranged on those surfaces of the slide ring other than the junction surface of the slide ring with the back ring, thereby fully avoiding an overlap between the circumferential cut and any one of the parting lines. In this case, no parting lines are present at all on the junction surface of the slide ring with the back ring, thereby essentially avoiding such a phenomenon itself that the back ring is worn by a parting line.

It is enough that the parting line on the surface of the slide ring is shifted relative to the circumferential cut of the through-cut. Thus, in a case that the through-cut is formed simultaneously with injection molding, it is enough that: the junction of molds of the mold corresponding to the position of the junction surface of the slide ring with the back ring is arranged shiftedly from the molding position of the circumferential cut toward an axial end side of the slide ring; or the molding position of the circumferential cut is alternatively arranged shifted from the junction of molds toward an axial end side of the slide ring. Contrarily, in the case that the through-cut is belatedly worked out after injection molding, it is enough that the position of the circumferential cut to be belatedly worked out is shifted from the parting line having been already formed on the slide ring, toward an axial end side of the slide ring.

Next, embodiments of the present invention will be explained with reference to the drawings.

FIG. 1 is a cross-sectional view of a sealing device according to the present invention.

This sealing device 1 is provided in such a configuration to be fitted in an annular concave groove formed on an outer periphery of a shaft such as a piston seal to be inserted into and slid relative to a shaft hole, and the sealing device has a slide ring 2 made of a resin molded by injection molding or the like, and a back ring 3 made of an elastic body joined to an inner peripheral surface side of the slide ring 2.

The slide ring 2 has a through-cut 22 in a step cut shape, and the through-cut comprises: a single circumferential cut 22A extending over a predetermined length along a circumferential direction of the slide ring; and two axial cuts 22B, 22B extending from both ends of this circumferential cut 22A in mutually opposite directions, respectively, along the axial direction (X direction in this figure) of the slide ring 2; and the through-cut 22 is exposed at a junction surface 21 of the slide ring with the back ring 3. Here, the circumferential cut 22A is arranged at an axial center of the slide ring 2.

Further, the slide ring 2 has surfaces provided with two parting lines 23A, 23B comprising stepped portion, burrs, or the like formed by junction of molds upon molding, respectively, and one parting line 23B of them is arranged at the junction surface 21 with the back ring 3.

The parting line 23B arranged at the junction surface 21 with the back ring 3, is located at a position shifted toward an axial end side (right side in FIG. 1), from the circumferential cut 22A of the through-cut 22 similarly exposed at the junction surface 21 with the back ring 3. Thus, the parting line 23B simply extends across only one axial cut 22B of the through-cut 22, so that the parting line 23B never extends across both of the two axial cuts 22B, 22B nor is contacted therewith, and the parting line 23B is never overlapped nor aligned with the circumferential cut 22A throughout the lengthwise direction of the circumferential cut.

Figure 2:
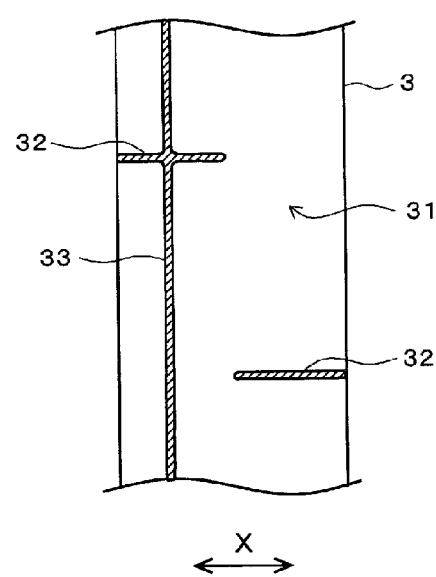
FIG. 2 is a partial plan view of a junction surface of a back ring with a slide ring, in the sealing device according to the present invention.

The back ring 3 has a junction surface 31 with the slide ring 2, and when the sealing device 1 is used over a long period of time, the junction surface 31 is brought to be formed with: damaged portions 32, 32 extending in the axial direction, to be formed due to the axial cuts 22B, 22B of the through-cut 22 of the slide ring 2, respectively; and a damaged portion 33 extending in the circumferential direction, to be formed due to the parting line 23B, as shown in FIG. 2. Nonetheless, the damaged portion 33 extending in the circumferential direction never communicate the two damaged portions 32, 32 extending in the axial direction with each other, so that a leakage channel otherwise tending to deteriorate the sealability is never formed, thereby keeping the sealability over a long period of time.

Figure 3:
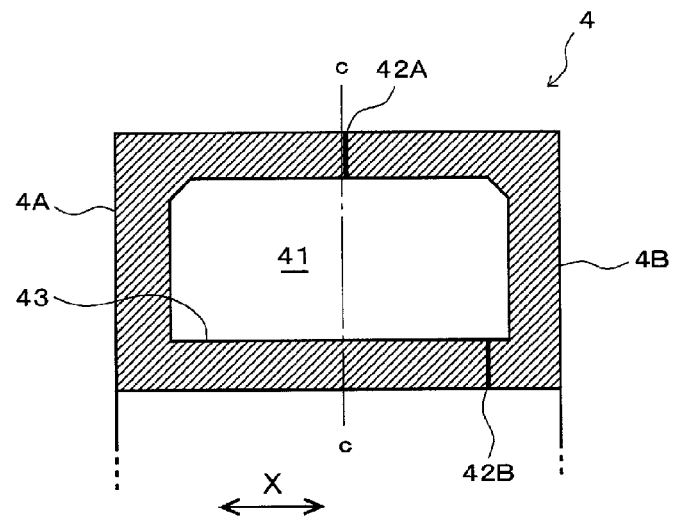
FIG. 3 is a cross-sectional view of a mold for injection molding the slide ring of the sealing device according to the present invention.

FIG. 3 is a cross-sectional view of a mold to be used upon injection molding the slide ring 2 in the sealing device 1.

The mold 4 has a cavity 41 therein corresponding to a shape of the slide ring 2, and is configured to be dividable into two partial molds 4A, 4B at junction of molds 42A, 42B, in a manner to be openable in the axial direction of the slide ring 2.

The molded slide ring 2 has surfaces formed with the parting lines 23A, 23B along the circumferential direction by these junction of molds 42A, 42B, respectively. However, the junction of molds 42B, which extends in a direction orthogonal to a cavity surface 43 corresponding to the junction surface 21 of the slide ring 2 with the back ring 3, is located at a position shifted to an axial end side (right side in the figure) of the cavity 41 from an axial center c of the cavity 41. In this way, when the through-cut 22 is formed such that the circumferential cut 22A thereof is arranged at the axial center C of the slide ring 2 as shown in FIG. 1, the junction surface 21 of the slide ring 2 with the back ring 3 is formed with the parting line 23B arranged shiftedly toward an axial end side from the circumferential cut 22A.

In this way, the thus molded slide ring 2 is configured such that the parting line 23B simply extends across only one axial cut 22B of the through-cut 22, so that the parting line 23B never extends across both of the two axial cuts 22B, 22B nor is contacted therewith, and the parting line 23B is never overlapped nor aligned with the circumferential cut 22A throughout the lengthwise direction of the circumferential cut, as described above. Therefore, the back ring 3 is never brought to be formed with a leakage channel otherwise tending to deteriorate the sealability, thereby keeping the sealability over a long period of time.

Moreover, according to the embodiment adopting the mold 4 shown in FIG. 3, it is enough that the junction of molds 42B at the cavity surface 43 corresponding to the junction surface 21 of the slide ring 2 with the back ring 3, is shifted toward the axial end side of the cavity 41 from the axial center c of the cavity 41. This provides such an effect that the opening operation of the mold 4 can be conducted fully unchangedly from the conventional, and drawing of the slide ring 2 from the mold after molding can be conducted substantially unchangedly from the conventional.

Figure 4:
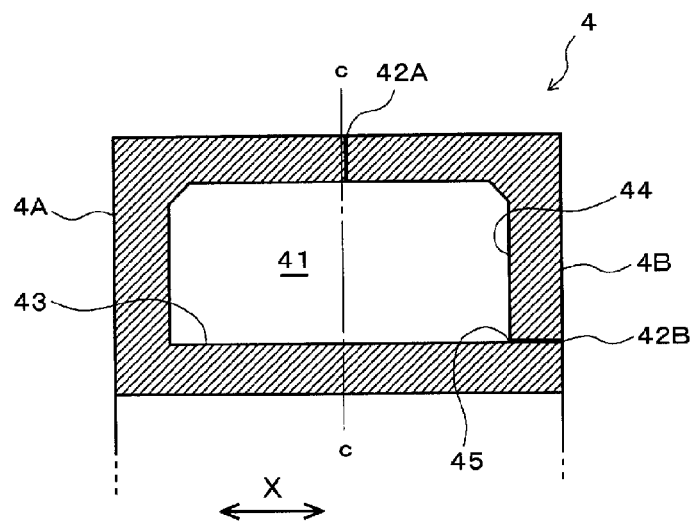
FIG. 4 is a cross-sectional view of another embodiment of a mold for injection molding the slide ring of the sealing device according to the present invention.

FIG. 4 is a cross-sectional view of another embodiment of a mold.

This mold 4 is configured such that both the junction of molds 42A, 42B for dividing the mold 4 into two partial molds 4A, 4B are not arranged on the cavity surface 43 corresponding to the junction surface 21 of the slide ring 2 with the back ring 3. Here, the junction of molds 42B closer to the cavity surface 43 is arranged: to extend in a direction orthogonal to a cavity surface 44 corresponding to one end surface of the slide ring 2 in its axial direction; and to be positioned along an intersection line 45 between the cavity surface 44 and the cavity surface 43. This causes all the junction of molds 42A, 42B to be arranged at the surfaces of the mold corresponding to those surfaces of the slide ring other than the junction surface of the slide ring with the back ring.

Figure 5:
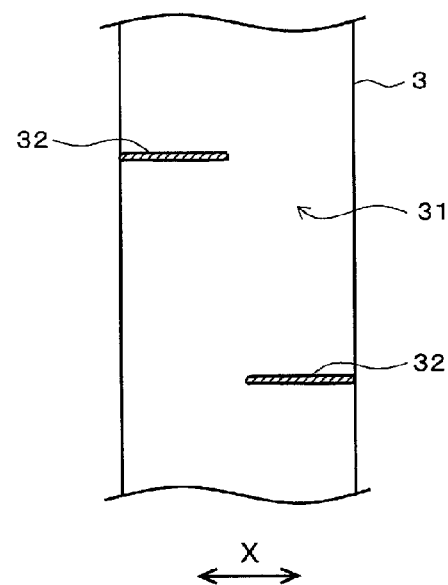
FIG. 5 is a partial plan view of a junction surface of a back ring of a sealing device having a slide ring injection molded by the mold shown in FIG. 4, with the slide ring.
Figure 6:
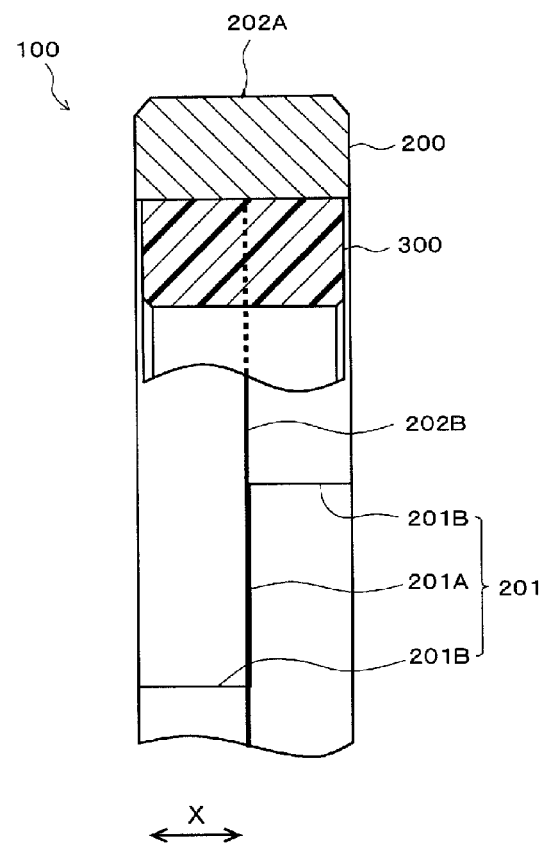
FIG. 6 is a cross-sectional view of a conventional sealing device.
Figure 7:
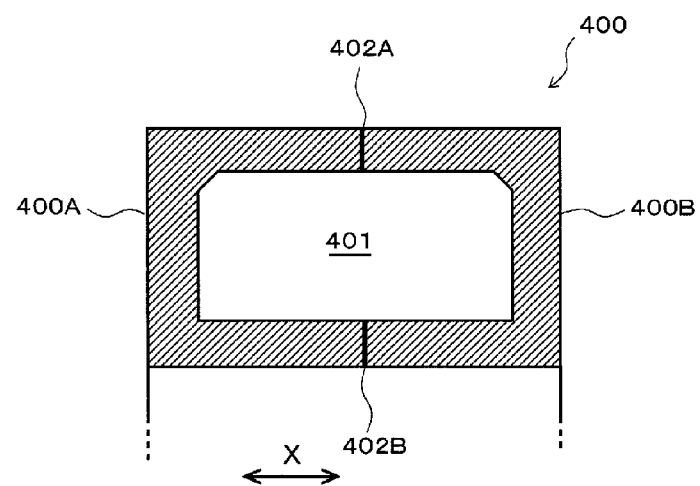
FIG. 7 is a cross-sectional view of a mold for injection molding a slide ring of the conventional sealing device.
Figure 8:
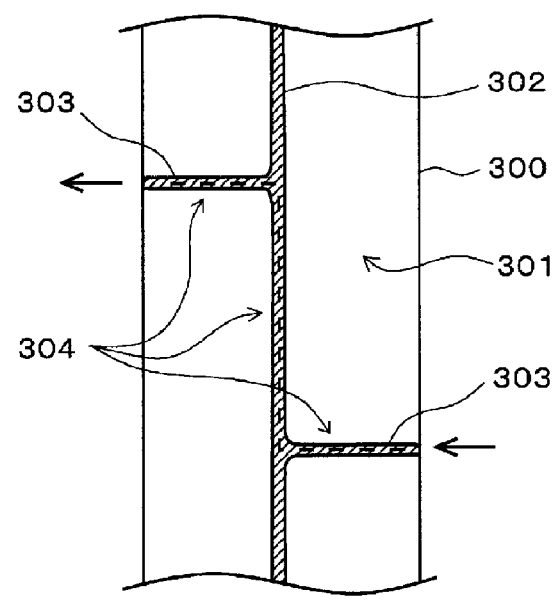
FIG. 8 is a partial plan view of a junction surface of a back ring with the slide ring, in the conventional sealing device.

Thus, the slide ring molded by using the mold 4 shown in FIG. 4 is made to have parting lines, all of which are arranged at surfaces of the slide ring other than the junction surface of the slide ring with the back ring, so that the junction surface of the slide ring with the back ring is never formed with such a parting line 23B along the circumferential direction as seen in FIG. 1. As a result, the outer peripheral surface of the back ring 3 to be combined with such a slide ring is simply formed with damaged portions 32, 32 due to the axial cuts 22B, 22B of the through-cut 22, respectively, as shown in FIG. 5, even by a long-term usage, and damaged portions are never formed on the outer peripheral surface due to any parting line.

Therefore, according to the embodiment adopting the mold 4 shown in FIG. 4, such a parting line is never formed in itself at the junction surface of the slide ring with the back ring, which parting line otherwise causes a leakage channel tending to deteriorate the sealability, thereby enabling to further ensure the effect to keep the sealability over a long period of time.

It is noted that, although the parting line 23A (junction of molds 42A at the mold 4) arranged at the sliding surface side (here, outer peripheral surface side) of the slide ring 2 has been arranged substantially at the axial center C, this parting line 23A never attacks the back ring 3, so that the position of the parting line is not limited to the center C insofar as the opening operation of the mold is not obstructed.

The invention claimed is:

1. A sealing device having: a slide ring made of a resin; and a back ring made of an elastic body joined to an inner peripheral surface or outer peripheral surface of the slide ring as a junction surface; the sealing device being configured to seal an annular gap between a housing having a shaft hole, and a shaft inserted through the shaft hole in a manner to conduct a movement relative to the housing;

wherein the slide ring has: a through-cut in a step cut shape, comprising a single circumferential cut extending along a circumferential direction of the slide ring, and two axial cuts extending from both ends of the circumferential cut in mutually opposite directions, respectively, along the axial direction of the slide ring; and multiple parting lines formed on a surface of the slide ring along the circumferential direction of the slide ring, where the parting lines have been formed by injection molding the slide ring by a mold dividable into multiple partial molds at multiple junction of molds along the circumferential direction of the mold, and by subsequently parting the mold at the junction of molds; and wherein the parting lines are arranged so that the parting lines are not overlapped with the circumferential cut exposed at the junction surface of the slide ring with the back ring, throughout the lengthwise direction of the circumferential cut.

2. The sealing device according to claim 1, wherein that of the multiple parting lines which is formed at the junction surface of the slide ring with the back ring, is arranged at a position shifted from the circumferential cut toward an axial end side of the slide ring.

3. The sealing device according to claim 1, wherein all the parting lines are arranged on those surfaces of the slide ring other than the junction surface of the slide ring with the back ring.

* * * * *